US012676952B2

(12) United States Patent
Marty et al.

(10) Patent No.: US 12,676,952 B2
(45) Date of Patent: Jul. 7, 2026

(54) CHROMATIC ABERRATION CALIBRATION AND VALIDATION SYSTEM

(71) Applicant: LOFT DYNAMICS AG, Dübendorf (CH)

(72) Inventors: Christian Marty, Schindellegi (CH); Hannes Diethelm, Schlieren (CH); Simon Locher, Zürich (CH)

(73) Assignee: Loft Dynamics AG, Dübendorf (CH)

( * ) Notice: Subject to any disclaimer, the term of this patent is extended or adjusted under 35 U.S.C. 154(b) by 0 days.

(21) Appl. No.: 18/840,508

(22) PCT Filed: Feb. 21, 2023

(86) PCT No.: PCT/EP2023/054301
§ 371 (c)(1),
(2) Date: Aug. 22, 2024

(87) PCT Pub. No.: WO2023/161224
PCT Pub. Date: Aug. 31, 2023

(65) Prior Publication Data
US 2025/0168318 A1 May 22, 2025

(30) Foreign Application Priority Data
Feb. 23, 2022 (EP) .................................... 22158367

(51) Int. Cl.
*H04N 13/327* (2018.01)
*H04N 13/15* (2018.01)
(Continued)

(52) U.S. Cl.
CPC ........... *H04N 13/327* (2018.05); *H04N 13/15* (2018.05); *H04N 13/239* (2018.05); *H04N 13/324* (2018.05); *H04N 13/344* (2018.05)

(58) Field of Classification Search
CPC .... H04N 13/106; H04N 13/15; H04N 13/239; H04N 13/246; H04N 13/279;
(Continued)

(56) References Cited

U.S. PATENT DOCUMENTS 10,277,893 B1 * 4/2019 Yoon ...................... H04N 23/90
11,132,055 B2 * 9/2021 Jones ................. G02B 27/0093
(Continued)

OTHER PUBLICATIONS

International Search Report issued for corresponding international patent application No. PCT/EP2023/054301, mailed Apr. 19, 2023 (6 pages).
(Continued)

*Primary Examiner* — Behrooz M Senfi
(74) *Attorney, Agent, or Firm* — Osha Bergman Watanabe & Burton LLP

(57) ABSTRACT

A system for chromatic aberration and geometry calibration and validation of VR HMDs has a left eye display and a right eye display, comprises a measurement device with a left (11) and a right (12) camera. A control unit, connected to the two cameras, is configured to deliver control signals to the HMD when attached to the measurement device and with the camera IPD is equal to the HMD IPD and a virtual IPD, the control unit is configured to effect a measurement comprising the steps of: creating a virtual target object having am image center identifying element (523) for each camera (11, 12) and a plurality of predetermined points (525) within the FOV of the cameras, calculating and transmitting the images of said virtual target object to the displays of the HMD, taking the images of the displays with the cameras, detecting the virtual object (535) within the images, determining the shift (555) for the plurality of predetermined points (525) of the virtual object, for creating a chromatic aberration heatmap and a subsequent chromatic aberration validation, or for calculating the distortion of the predetermined points within
(Continued)

the FOV of the cameras for creating a geometric correction mapping for the HMD for a geometry calibration of the HMD; or for using the shift for creating a heatmap for the HMD and determining the geometry validation or denying the geometry validation.

9 Claims, 11 Drawing Sheets

(51) Int. Cl.
  *H04N 13/239* (2018.01)
  *H04N 13/324* (2018.01)
  *H04N 13/344* (2018.01)

(58) Field of Classification Search
  CPC .. H04N 13/324; H04N 13/327; H04N 13/344; H04N 17/004; H04N 2013/0081
  USPC .......................................................... 348/42
  See application file for complete search history.

(56) References Cited

U.S. PATENT DOCUMENTS

| | | | |
|---|---|---|---|
| 11,233,986 B1 * | 1/2022 | Yoon ..................... | H04N 23/611 |
| 2012/0075435 A1 | 3/2012 | Hovanky et al. | |
| 2019/0222824 A1 | 7/2019 | Sheridan | |
| 2021/0215940 A1 * | 7/2021 | Freese ....................... | G06T 7/90 |
| 2021/0398358 A1 | 12/2021 | Seiler | |
| 2023/0393654 A1 * | 12/2023 | Hudman ................. | G06F 3/013 |
| 2025/0054233 A1 * | 2/2025 | Marty .................. | G02B 27/017 |

OTHER PUBLICATIONS

Written Opinion issued for corresponding international patent application No. PCT/EP2023/054301, mailed Apr. 19, 2023 (24 pages).
Anonymous; "Heat Map," Wikipedia, Retrieved from the Internet: URL:https://en.wikipedia.org/w/index.php?title=Heat_map&oldid= 1064797656 [retrieved on Aug. 21, 2024] (7 pages).

* cited by examiner

Set virtual, camera and HMD IPD to same value — 310

Place virtual target, capture images with both cameras, detect lines on target — 320

395

Change to next color channel

Compute mapping between real and measured angles and store result — 380

Are all color channels done? — 390

No

Yes

397 — Done

CHROMATIC ABERRATION CALIBRATION AND VALIDATION SYSTEM

TECHNICAL FIELD

The present invention relates to a chromatic aberration calibration and validation and system.

PRIOR ART

CN 111583310A provides a virtual-real registration method and device for virtual reality and augmented reality equipment, and the method comprises the steps: calculating a projection matrix through an image photographed by a camera, and avoiding a subjective error caused by human eye setting. The sizes and distances of the test pattern and the virtual object can be adjusted according to actual conditions and the device can adapt to different models. Only two cameras and two computers are needed and are fixed, a moving device is not present during operation, and virtual-real mismatching caused by large equipment assembly difference can be effectively reduced in view of tilt and rotation.

CN 111610638A provides an adjustment testing device and method for an optical module in binocular head-mounted equipment. The testing device comprises a first camera and a second camera for simulating two eyes, a camera positioning mechanism for calibrating the positions of the first camera and the second camera, a first adjusting mechanism and a second adjusting mechanism for respectively adjusting a first optical module and a second optical module, and a bracket fixing device for fixing a binocular bracket. The adjusting mechanism adjusts the angle of the optical module according to the obtained rotation angle and inclination amount so as to compensate adverse effects of structural tolerance and assembling tolerance of the optical module on imaging quality.

US 2021/215940 A1 is related to a calibration system that includes a calibration target having one or more calibration objects, a head mounted display (HMD), and a rendering engine configured to render, based on an estimated pose of the HMD, respective virtual calibration objects in a viewing area of the HMD at respective locations corresponding to the one or more calibration objects visible in the viewing area, wherein the HMD is configured to output the virtual calibration targets. The calibration system further includes an image capture system configured to capture image data comprising images of the viewing area of the HMD, and a calibration engine configured to compute, from the image data, difference data comprising respective distances between the one or more calibration objects and the respective, corresponding virtual calibration objects.

WO 2017/196405 A1 shows a display pre-distortion method comprising: determining a position of a pupil relative to a lens of a head-mounted display (HMD); determining, based on the determined position, a pre-distortion map for an image to be displayed on a display screen of the HMD associated with the pupil; and displaying the image on the display screen of the HMD, wherein the image is modified by the pre-distortion map.

U.S. Pat. No. 10,277,893 B1 describes a camera assembly including a characterization camera configured to capture one or more images of content presented by a head-mounted display (HMD) under test in accordance with imaging instructions, the characterization camera positioned in an eye box region of the HMD under test and configured to imitate movement of a human eye; and a controller configured to: generate the imaging instructions, the imaging instructions describing one or more positions of the characterization camera and providing instruction for a number of exposures at each of the one or more positions, instruct the HMD under test to present a test pattern, provide the imaging instructions to the camera assembly, and measure distortion of one or more optical elements in the HMD under test using one or more images captured by the camera assembly.

US 2017/293146 A1 discloses an accommodation based optical correction wherein a specific image for the frame of the virtual scene is shown on the electronic display element with a pre-distortion of the distortion correction for the determined focus state, wherein the light of the image displayed with the pre-distortion being complementarily distorted by the optics block.

US 2017/161951A1 discloses a method of correction for distortion from optical errors of an optics block in a headset to improve a scene presented by said headset. To correct for the distortion, the scene is pre-distorted when presented based on previously modelled distortion of the optics block, so distortion from the optics block corrects the pre-distortion. To model the distortion, the headset displays calibration image including features and images of the calibration image are captured from multiple positions. Differences between locations of features in the calibration images and locations of corresponding features in captured images of the calibration image are identified and a distortion correction is determined based on the differences.

U.S. Pat. No. 10,317,680 B1 describes an optical aberration correction based on user eye position in head mounted displays, especially based on the determined focus state of the optics block.

US 2012/075435 A1 discloses a 3D display system and methods for its calibration. In one embodiment, a method and system for calibrating a 3D display using feedback indicative of measurements of light, emitted from the 3D display, inter alia during display of a test pattern, by a camera device.

US 2021/398358 A1 discloses a method accessing a distortion definition for a first color component of a collection of pixels; casting, from a viewpoint in a three-dimensional (3D) space, a first bundle of rays for the first color component in accordance with the distortion definition; computing a first set of intersection locations between the cast first bundle of rays and an object in the 3D space; determining that a difference between distortions of the first color component and a second color component is greater than a first predetermined threshold and less than a second predetermined threshold; determining the second set of intersection locations on the object for the second color component based on shifting the first set of intersection locations; and determining color values for the collection of pixels based on the first and second sets of intersection locations.

SUMMARY OF THE INVENTION

In VR aviation training applications using HMDs the correct distance estimation and depth perception is essential, especially when the application is related to helicopter simulations where depth perception is essential to land the aircraft safely. There is an unacceptable risk of negative training on the simulator if depth perception and geometry are not correct.

This problem has several aspects to be handled by different validation and calibration procedures. First of all, the correct distance estimation and depth perception is important for a specific wavelength. The co-pending EP 21 214 021.4 of the applicant is related to validation system for VR HMDs which content is incorporated herein by reference. Secondly, it is essential for wearing comfort that an HMD is worn as close to the head as possible. In order to still create an immersive experience with a large field of view (FOV), complex lens systems must be used. These show a strong geometric distortion (e.g. a straight horizon is displayed curved). Furthermore, modern HMDs project full color images and therefore the additional effect of chromatic aberration is to be recognized and the HMD has to be validated for a full range of colors.

Some HMDs have electronically sliding lenses and displays which can have play. Additionally, the lens may have a hysteresis, which means that the true lens position depends on whether the lens is shifted from the inside to the outside or from the outside to the inside.

The user's depth perception is manipulated and/or distorted if the displays of the HMD are not in the correct position. In addition, it can cause nausea and excessive eye strain for the user if the interpupillary distance of the lenses is not correct.

Based on this prior art it is an object of the present invention to provide a system allowing to validate the absence of chromatic aberration of lens systems used in a VR environment. Since most currently used HMDs would not fulfill such validation checks, it is an object to provide a system allowing to correct the distortion of such lens systems used in a VR environment, i.e. for a full color HMD to be calibrated, the chromatic aberration is to be corrected. On the basis of these calibrations, it is possible to validate an HMD to be tested for a region of user related application values.

The object is achieved with a system for chromatic aberration and geometry calibration and validation of VR HMDs which has a left eye display and a right eye display, comprises a measurement device configured in a way that an HMD to be calibrated or validated is attachable to it in a way as such an HMD would be removably attached to the head of a user. The measurement device comprises therefore a left and a right camera, wherein each camera is intrinsically and extrinsically calibrated, and a control unit connected to the two cameras as well as configured to deliver control signals to the HMD when removably attached to the measurement device and when the camera IPD is manually or automatically adjusted to the prechosen HMD IPD. The control unit is configured to effect a measurement comprising the steps of:

a.) setting the virtual IPD equal to the value of camera IPD, b.) creating a virtual target object having an image center identifying element for each camera and a plurality of predetermined points within the FOV of the cameras, b.) calculating and transmitting the images of said virtual target object to the displays of the HMD, c.) taking the images of the displays through the HMD lenses with the cameras, d.) detecting the virtual object within the images, e.) determining the shift for the plurality of predetermined points of the virtual object. The control unit is a computer unit implementing software to execute program code to fulfill the above mentioned process steps and the control unit is further configured for f1.) providing the plurality of predetermined points in the predetermined number of color channels and determining said shift for each color channel and using the shift between two of the color channels for calculating the distortion of the predetermined points within the FOV of the cameras for creating a chromatic aberration heatmap for these two colors for the HMD and determining the chromatic aberration validation or denying the chromatic aberration validation, if a predetermined number of points of the predetermined heatmap is inside or outside a predetermined heatmap threshold of the HMD, respectively; or f2.) providing the plurality of predetermined points in the predetermined number of color channels and determining said shift for each color channel and using, for each color channel separately, the shift for calculating the distortion of the predetermined points within the FOV of the cameras for creating a geometric correction mapping for the HMD for a geometry calibration of the HMD; or f3.) providing the plurality of predetermined points in the opposite color of the black or white background and determining said shift and using the shift between for creating a heatmap for the HMD and determining the geometry validation or denying the geometry validation, if a predetermined number of points of the predetermined heatmap is inside or outside a predetermined heatmap threshold of the HMD, respectively.

When the HMD to be validated is "flawless", then the HMD is validated using the first alternative f1.).

When chromatic aberration is an issue which will be the case for a plurality of HMDs, then the software creating the images for an application of the HMD is updated with an aberration correction module created based on the second alternative of the execution of the control unit. According to f2) the distortion of the predetermined points within the FOV of the cameras is determined for one or more groups of two different colors (vis-à-vis a white line) or between color couples (as red-green and blue-green) and used for creating a geometric correction mapping for the HMD for a number of predetermined colors for a geometry calibration of the HMD.

When such a correction according to f2) is applied, the HMD at stake will then successfully conduct the alternative f1.) validation.

Finally, the system according to the invention is capable to conduct a geometry validation for such an HMD according to alternative f3). There, the plurality of predetermined points is in the opposite color of the black or white background, i.e. white on black, or black on white and determining a possible shift. It is also possible to use a single color as red, blue or green on a black or white background for geometry validation.

The system is based on a measuring device connected with a control unit configured to control the measuring device and presenting an HMD to be verified with the corresponding simulated images.

The measuring device for the system for chromatic aberration and geometry calibration and validation has two cameras instead of the eyes of a user, wherein the cameras are intrinsically and extrinsically calibrated. It is possible but not necessary that these cameras can be moved in at least one dimension, i.e. inwards/outwards (IPD). Additional dimensions can be added to measure and validate, when the users eyes are not completely aligned with the height of the horizontal centerline of the HMD, i.e. the cameras can be moved upwards/downwards. The movement forwards and backwards check the influence of the position of the eyes in the eye sockets on the validation process. The degrees of freedom are used to perform the validation with deviation to the Design Eye Point (DEP). The HMD to be validated can have electronically shiftable displays/lenses or manually shiftable lenses with an electronic displacement meter which shows the chosen IPD in the display. Other HMDs have a number of specific, fixed IPDs as e.g. 59, 64, 69 millimeter, or the distance between the displays and lenses is chosen by a graduated slider. It is noted that HMDs may show hysteresis, i.e. the shown or communicated IPD in the case of an electronic displacement meter for a given position of the slider or of one of the fixed positions of the HMD IPD is different between the two scenarios, if the position is reached starting from a lower IPD or from a higher IPD. Therefore, preferably the measurements are taken twice, once from lowest possible HMD IPD to highest possible HMD IPD and then vice versa. The measurement can then be decided to be passed, if a supplementary condition is met, i.e. that the distance difference between the determined distance for the same HMD IPD reached from both sides (high to low and low to high) is within a given threshold or ratio.

The measuring device is connected to a control unit, configured to generate specific images for the two displays of the HMD creating a virtual target by calculating the image of the elements of the cylinder on the surface of the real left and right display, and reduced to the FOV of the real cameras. The elements of the cylinder as lines or corner points depending on the way the virtual image is created are each an element of the virtual target for which a possible geometric or chromatic distortion created by the creation of the image of the display through the real lenses of the HMD is detected and used in the framework of the present specification.

The virtual target object can comprise a separate image of a black cylinder portion with vertical lines in color or said opposite color to be taken by each camera with the image center identifying element being a centrally arranged line for each camera and the virtual camera being arranged on the center axis of the cylinder portion and a separate image of a cylinder portion with horizontal lines in color or said opposite color to be taken by each camera with the image center identifying element being a centrally arranged line for each camera and the virtual camera being arranged on the center axis of the cylinder portion. Such as solution uses a plurality of lines on both side of a center line. The center object is then also a line. The shift of the virtual target object then comprises a plurality of angle values between a plurality of two points on the same line. These angles can be chosen to be along the line, or they can be chosen to be the difference in angle between the line of a virtual point and its neighbor and a representation of said virtual point through the lens system.

The virtual target object can comprise a checkerboard target pattern or curved target pattern with a grid of quadrilaterals in color or said opposite color to be taken by each camera with the image center identifying element being a centrally detectable element for each camera and the virtual camera being arranged in the center of the sphere portion with the image center identifying element being a centrally arranged element for each camera and the virtual camera being arranged in the center of the sphere portion. The shift of the virtual target object can then comprise a plurality of corner shifts of such quadrilaterals.

With such a system it is possible to provide a sequence of images wherein the checkerboard target pattern or curved target pattern are used with a displacement of a predetermined fraction of the quadrilateral side length between such images to provide a higher resolution of the corner points. If the displacement is half of the length of a quadrilateral then the same situation occurs as if the number of lines in the above lines model is doubled in one or both directions.

The color channels can be chosen to be three color channels of the RGB color space or four color channels of the CMYK color space or a different color space model.

When the RGB space is chosen, within execution of above mentioned alternative f2.) two pairs of two color channels can be chosen in the RGB space, especially being red-and-green and blue-and-green, since green is the color with the least distortion so that this choice allows for an optimum evaluation of the distortion.

Providing the plurality of predetermined points in the opposite color of the black or white background is related to white points on a black background and to black points on a white background. There is no application of this alternative f3) for colored points in the traditional sense of blue-green-red and opposite colors to them. Here the determination of the shift is black-white and thus geometry based. The shift between the two different white or black points in relation to a center identifying element is used to create a heatmap for the HMD and determining the geometry validation or denying the geometry validation, if a predetermined number of points of the predetermined heatmap is inside or outside a predetermined heatmap threshold of the HMD, respectively. This is related to a pixel number of deviations as mentioned above.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED
EMBODIMENTS

Figure 4:
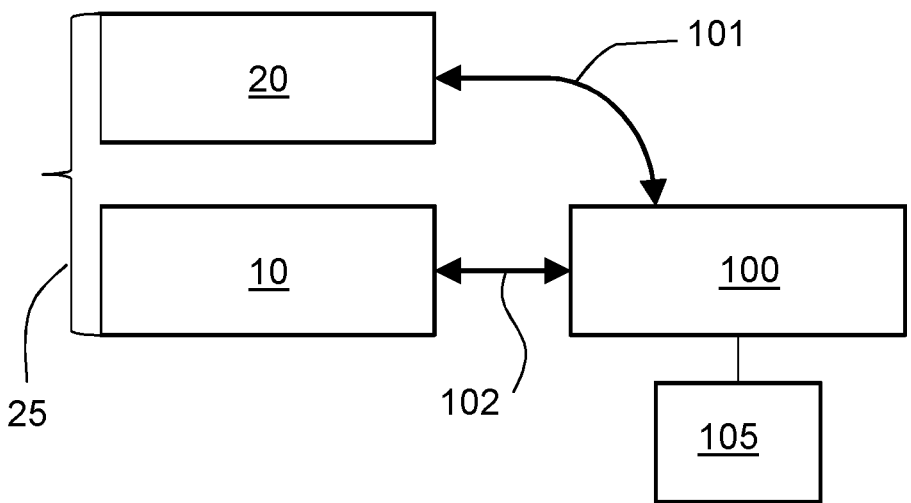
FIG. 4 shows a schematical diagram of the components of the calibration and validation device together with an HMD to be calibrated or validated.

FIG. 4 shows a schematical diagram of the components of the validation device together with an HMD 20 to be validated. The validation device comprises a control unit 100 to be connected with a measurement device 10. The control unit 100 comprises a microprocessor or computer unit configured to access a database 105 of parameters to generate simulated images, i.e. VR images to be transmitted via communication line 101 to the HMD 20 to be calibrated and/or validated. The HMD 20 to be calibrated/validated is removably attached to the measurement device 10 through a fixation element 25 which can be a strap or head band for a human head. The control unit 100 is connected to the measurement device 10 with a communication line 102 to move the measurement device 10 as explained in connection with FIG. 1. The communication lines 101 and 102 can be bidirectional as will be explained in connection with the subsequent drawings. It is noted that the HMD is exclusively a VR-HMD and not an AR-HMD.

Figure 1B:
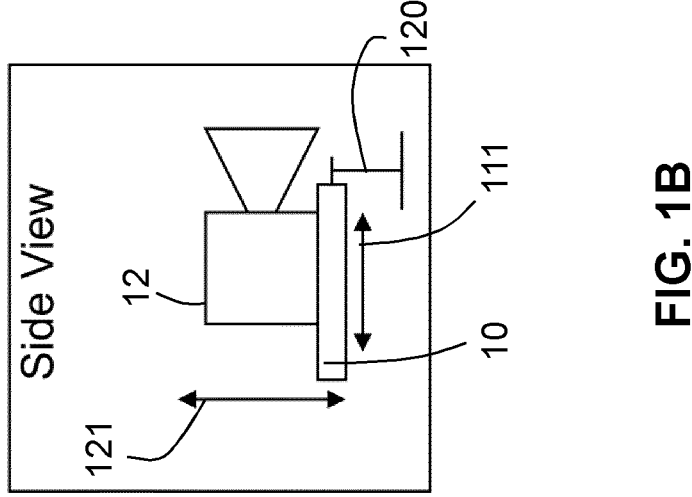
FIG. 1B shows a schematical side view on the measurement device according to FIG. 1A.
Figure 1A:
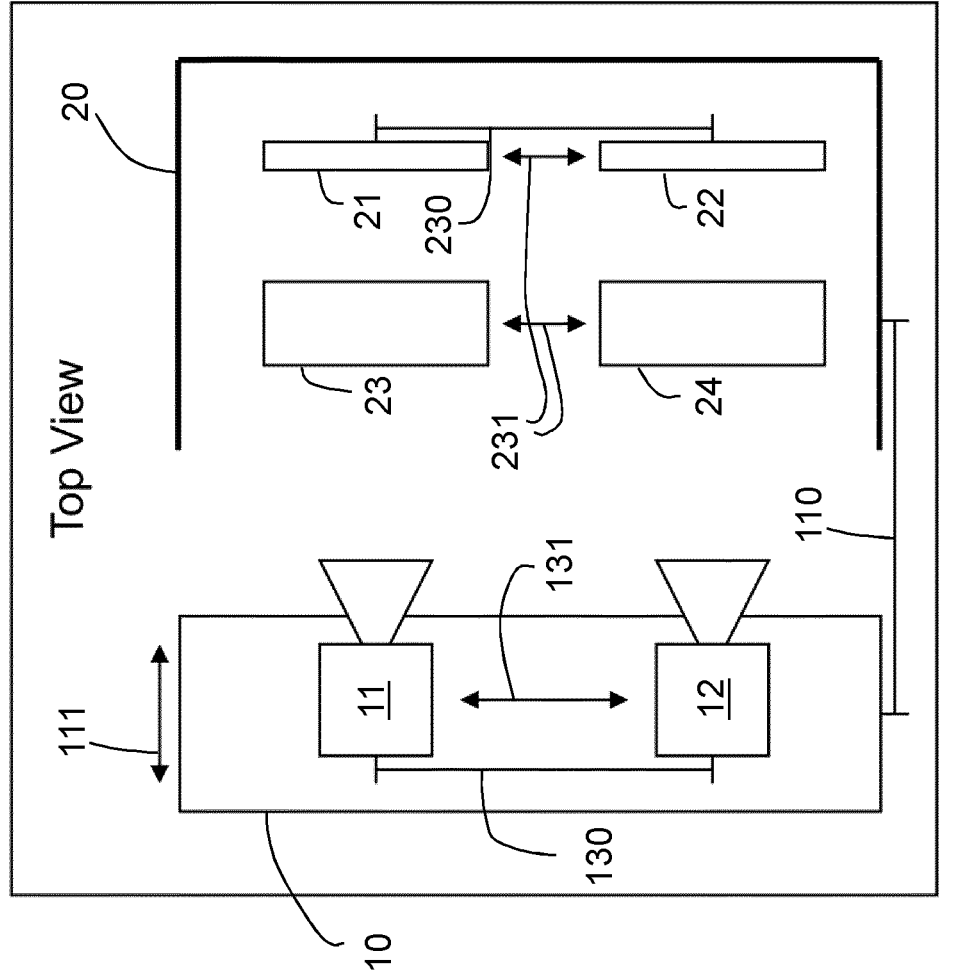
FIG. 1A shows a schematical top view on a measurement device for calibrating, correcting and validating the geometry and chromatic aberration of an HMD.

FIG. 1A shows a schematical top view on a measurement device 10 being part of a calibration/validation device for calibrating/validating the geometry and chromatic aberration of an HMD 20. FIG. 1B shows a schematical side view on the measurement device 10 of FIG. 1A. Preferably the measurement device 10 is built in a frame having the form of a human head to be able to affix to this measurement device 10 the HMD 20 in the same way as it will be attached to the head of a human user as trainee using the calibrated/validated HMD 20 for the intended VR aviation application.

The measurement device 10 has instead of two eyes two cameras, i.e. a left camera 11 and a right camera 12, respectively. Both cameras 11 and 12 are intrinsically and extrinsically calibrated. Such a calibration can e.g. be effected by using the approach of a Tsai calibration as published in R. Y. Tsai, "Metrology Using Off-the-Shelf TV Cameras and Lenses" in IEEE Journal of Robotics and Automation, Vol. 3, No. 4, pp. 323-344, August 1987. Other calibration models can be used as well.

The left and right cameras 11 and 12 can be moved in three dimensions: an inward/outward (IPD) movement 131 to set the camera IPD 130, a forward/backward or relief movement 111 representing the position and thus distance 110 of the eyes from the HMD 20 and an upwards/downwards or vertical movement 121 to represent the height position of the eyes vis-à-vis the height position 120 of the optical system with the optics 23, 24 of the HMD 20. The three directions are orthogonally one to each other and span a Cartesian coordinate system. The vertical movement 121 for the height position 120 as well as the relief movement 111 for the eye socket position 110 are performed for both cameras 11 and 12 whereas the IPD movement for IPD 130 is per definition a movement of the two cameras 11 and 12 independently one from the other but preferably symmetrically to the mirror axis between the two cameras 11 and 12. It is noted that according to the invention and the main claim only one movement is needed: an inward/outward (IPD) movement 131 to set the camera IPD 130.

Figures 2A, 2B:
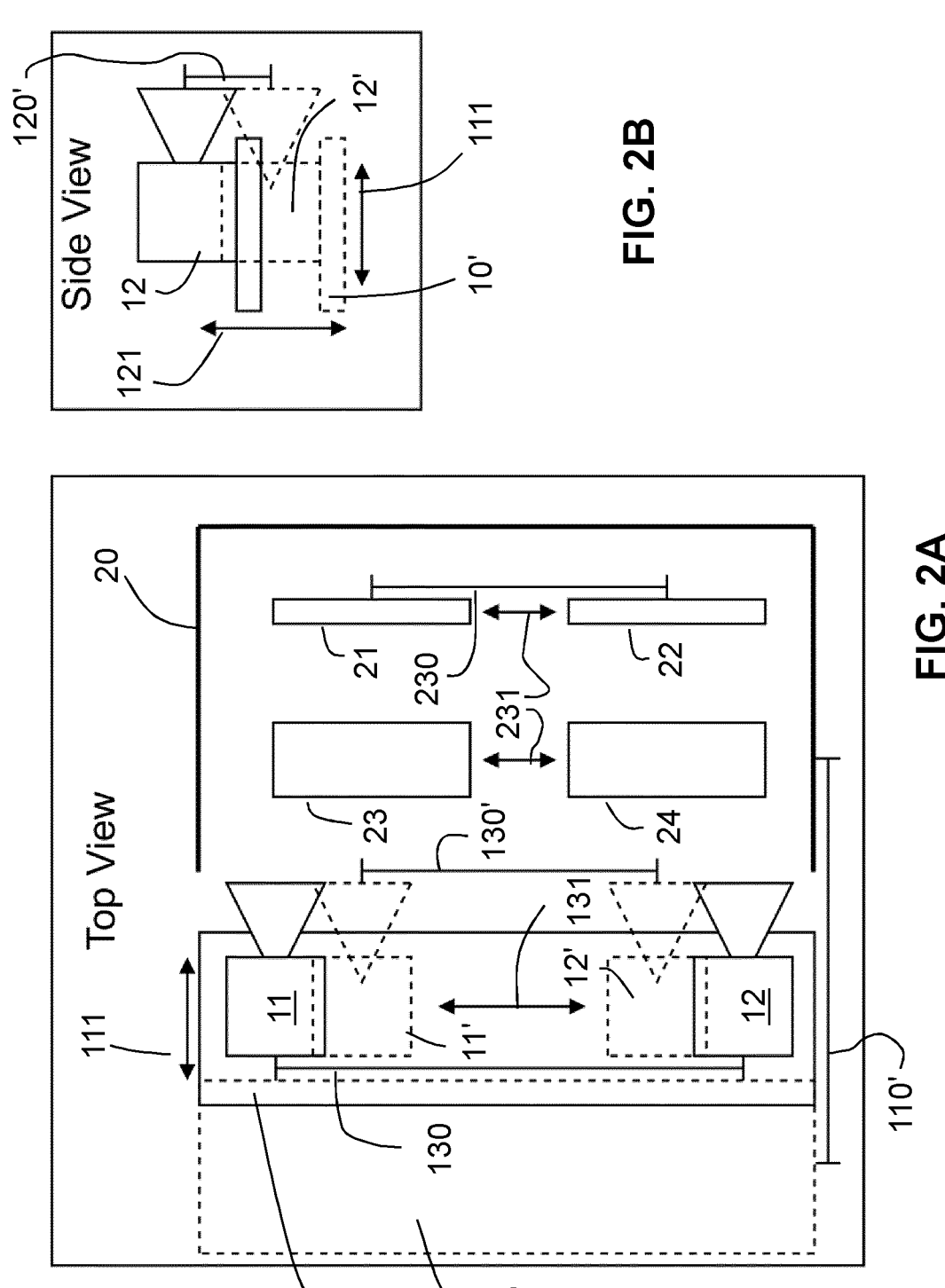
FIG. 2A shows a schematical top view on the measurement device according to FIG. 1A with a shifted measurement device.
FIG. 2B shows a schematical side view on the measurement device according to FIG. 1A with a shifted measurement device.

FIG. 2A and FIG. 2B show the same views as FIG. 1A and FIG. 1B with a shifted measurement device 10' and 10", respectively from its basis position shown as measurement device 10. The shifted measurement device 10" has a backward shifted device (cameras not shown). The shifted measurement device 10' has a downward shifted device as well as cameras 11 and 12 moved one towards the other, i.e. reducing the camera IPD 130 for the camera positions 11' and 12', respectively.

The total IPD movement 131 is divided in two identical portions, i.e. 50% of the movement to the right for the left camera 11 and 50% of the movement to the left right for the right camera 12. It is an advantage to have a correlated left and right movement of the camera 11 and 12, since it is then possible to give the measurement device the form of a human head with a nose, centering the HMD on the nose, when attached with a band 25 around the head, and having half of the IPD to the left and half of the IPD to the right of the vertical symmetry plane being the sagittal plane.

Reference numerals 130' for the camera IPD, 120' for the height position of the cameras as well as 110' for the eye socket position are the positions after the movement and adjustment of the measurement device. The height of the horizontal centerline of the HMD compared to the horizontal centerline of the eyes of the user is mainly predetermined by the way the HMD 20 is positioned on the head. Therefore, using the methods of the invention for different height positions of the cameras 11 and 12, e.g. a low, a centered and a high height position allows to determine the influence of this departure from the DEP.

The movement of the cameras 11 and 12 from their initial position towards the shown positions 11' and 12' allow the positioning aligned before the left eye display 21 and right eye display 22 of the HMD. In front of the left and right eye displays 21 and 22, respectively are positioned a left side optics 23 and a right side optics 24. The optics 23 and 24 are mechanically connected to the respective displays 21 and 22 for a connected sideways movement according to arrow 231 being the adjustment of the HMD IPD 230. In other words, arrow 231 represents the possibility for the user to adapt the HMDs IPD 230 to his personal IPD. The aim of the present measurement device 10 is to validate the HMD 20 for one chosen HMD IPD 230 which can then be adjusted by the user for his own experience, preferably based on a previously measured human IPD, i.e. adjusting the HMD IPD value to this known value. The validation method can be reduced to be only conducted for one single IPD. However, in view of a calibration/validation procedure for a predetermined HMD device 20, it is contemplated that such an HMD can be validated for specific chosen plurality of HMD IPDs, preferably for a range of IPD values covering the entire adjustable range of the HMD, e.g. at least a minimal IPD, a middle IPD and a maximal IPD, optimally for every settable value of the HMD 20. But the geometry and chromatic aberration calibration does not need to be done for multiple IPD settings in the present context, since the IPD setting can already be validated in a previous step and method.

The degrees of freedom are used to perform the validation with deviation to the Design Eye Point (DEP) or Design Eye Reference Point (DERP), or to meet the different DEPs of different HMD models. This is reflected by the measurement IPD distance.

The HMD 20 can have electronically shiftable displays 21, 22 and lenses (optics) 23, 24. The lenses (optics) 23, 24 can also be manually shiftable lenses with an electronic displacement meter. This is mainly related to current technology of VR-HMDs 20.

Figure 3B:
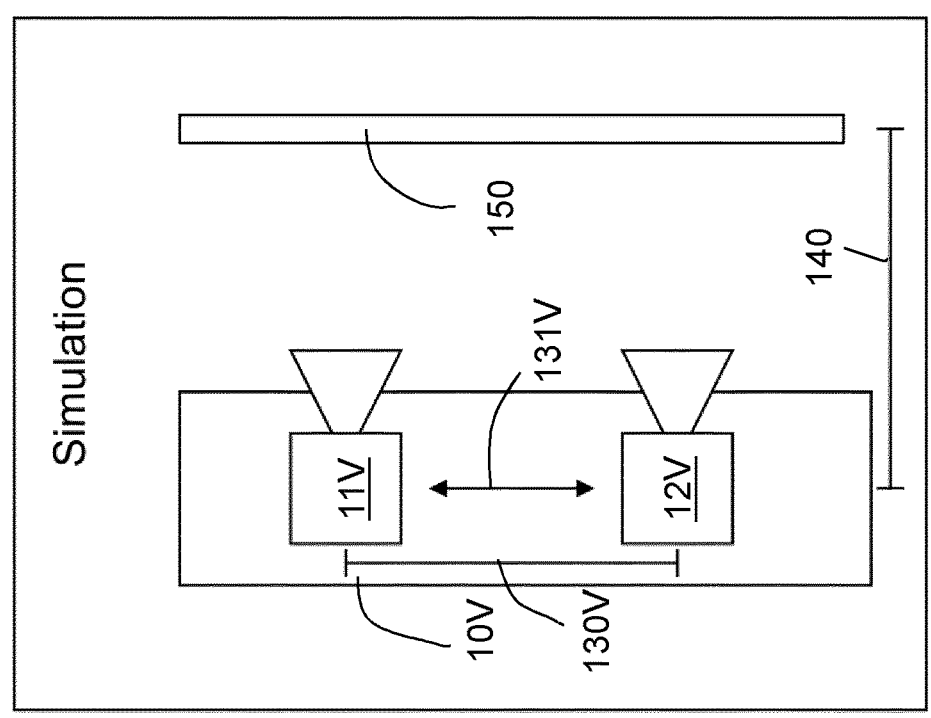
FIG. 3B shows a schematical top view of the simulation, i.e. software situation, corresponding to the measurement device of FIG. 3A.
Figure 3A:
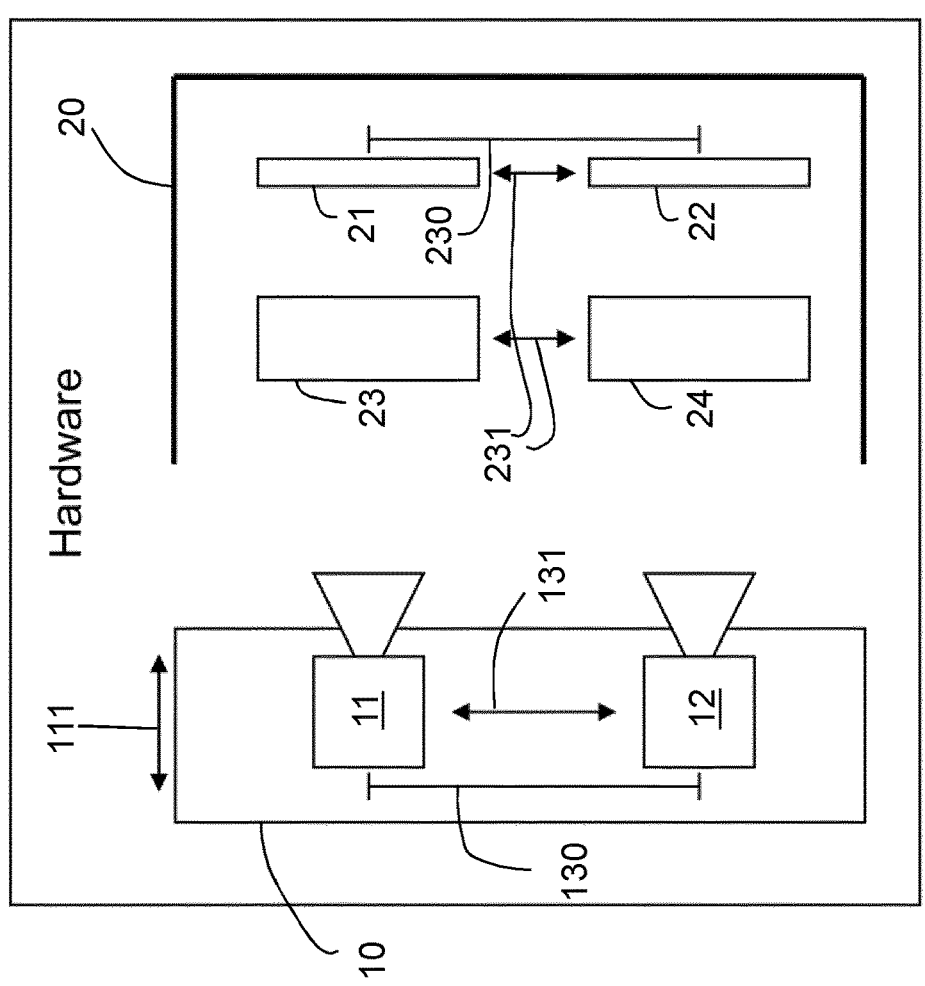
FIG. 3A shows a schematical top view on the measurement device according to FIG. 1 as hardware.

FIG. 3A shows a schematical top view of the hardware components and FIG. 3B show the software situation, corresponding to the measurement device of FIG. 3A. The virtual camera rig 10V has a virtual left camera 11V and the virtual right camera 12V are simulated in a virtual IPD 130V, realizing a virtual target 150 in the simulated target distance 140.

Figures 5A, 5B, 5C:
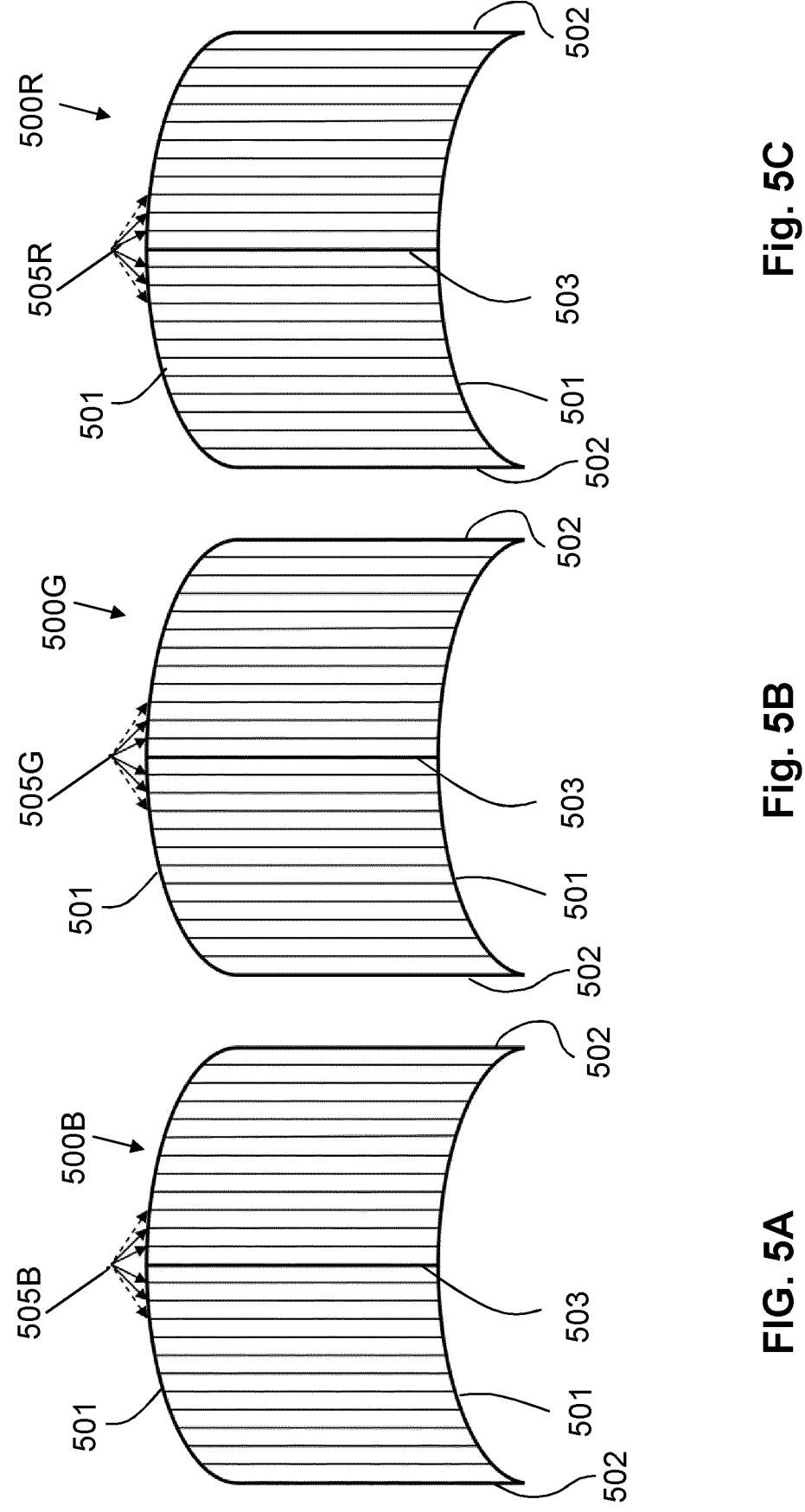
FIG. 5A shows a schematical diagram of a virtual target for the red color channel.
FIG. 5B shows a schematical diagram of a virtual target for the green color channel.
FIG. 5C shows a schematical diagram of a virtual target for the blue color channel.

FIGS. 5A, 5B and 5C show schematical diagrams of a virtual target for the red, green and blue color channel, respectively. Each drawing shows a virtual black cylinder 500B, 500G, 500R with an upper and lower border 501 and side borders 502. The side borders 502 are here 180 degrees apart. This value is chosen depending on the maximal FOV of the HMD. It has to be larger than the possible viewing angle of the HMD (see FOV areas 504L, 504R and 504 of FIGS. 6A, 6B and 6C) and 180 degrees is a convenient value. The middle line 503 is a white line and between the opposite height borders 501 and a number of parallel blue lines 505B are provided on both sides of the middle line 503 towards the side borders 502 of the cylinder. The same is true for the virtual black cylinder 500G with green lines as well as for the virtual black cylinder 500R with red lines as well. In other words, the white areas of FIGS. 5A, 5B and 5C between lines 505B, 505G or 505R are black and do not provide any light transmitting through the lenses.

Figures 6A, 6B, 6C:
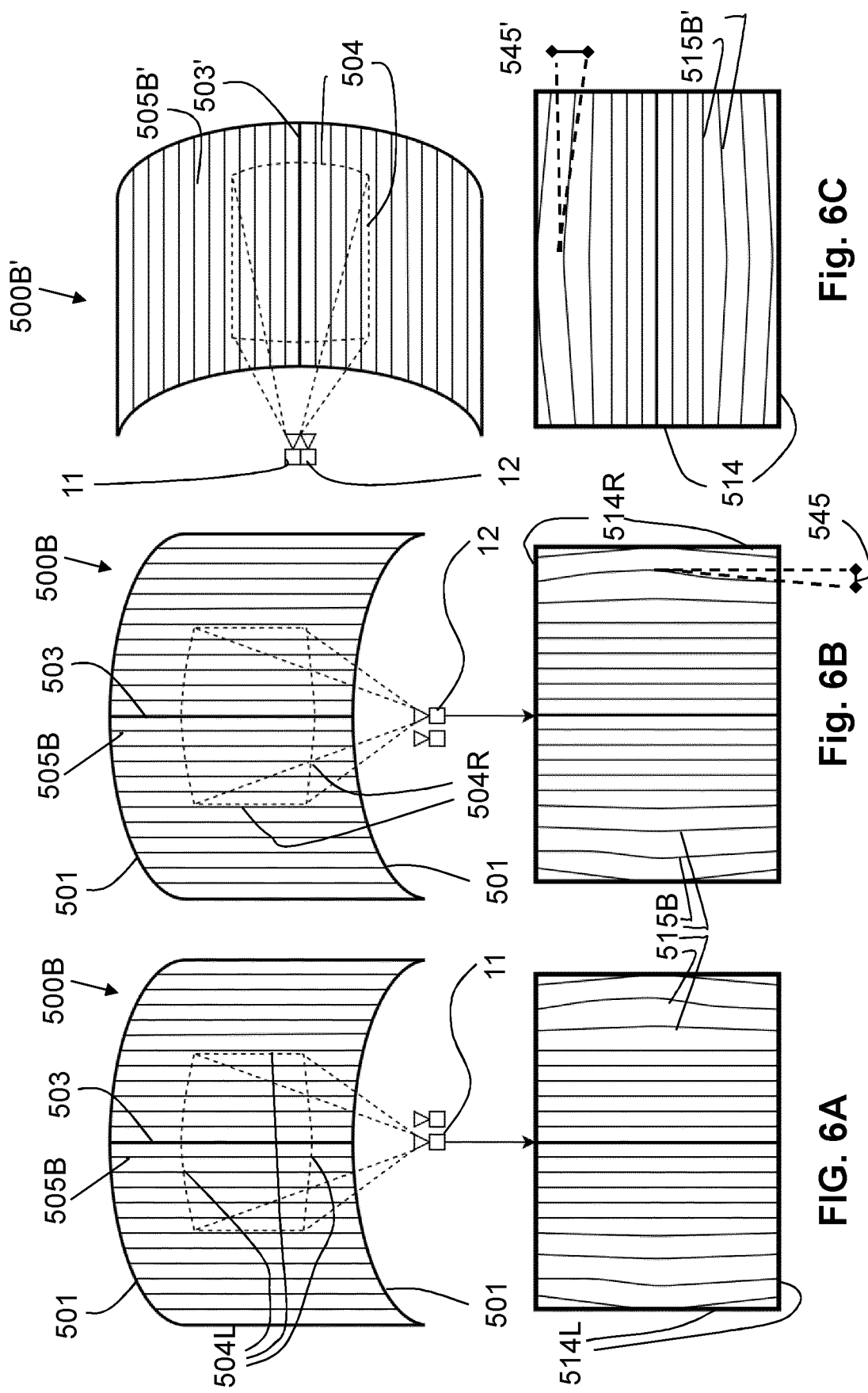
FIG. 6A shows a schematical diagram of the virtual target of FIG. 5A in one calibration step for the left virtual camera.
FIG. 6B shows a schematical diagram of the virtual target of FIG. 5A in a calibration step for the right virtual camera.
FIG. 6C shows a schematical diagram of the virtual target of FIG. 5A in a further calibration step for both virtual cameras.

The center line 503 as well as the further lines as e.g. blue lines 505B in FIG. 6A are virtual lines displayed on the left display to be captured by the real left camera 11 whereas center line 503 as well as blue lines 505B in FIG. 6B are virtual lines displayed on the right display to be captured by the real right camera 12. The center line 503' of FIG. 6C is identical for (and to be captured by) both real cameras 11 and 12 since they are provided on the same height position for the horizontally placed cylinder.

The invention is creating a virtual target object which has necessarily different representations on the left display and the right display in view of the IPD effect. Therefore, this virtual target object has an image center identifying element 503 which is different for the left and the right camera 11, 12 when the IPD matters, i.e. for the vertically oriented cylinder 500B and is the same image center identifying element 503' (but of course different from element 503) for a lying cylinder and a plurality of corresponding shifted predetermined points 505B within the FOV of the cameras 11, 12.

In other words the "image center identifying element" is by definition positioned in the center of the virtual cameras and there would be no reason why a center element would be needed for the virtual cameras as the virtual cameras and virtual target are fully controlled. Therefore, these center elements are used by the real cameras to identify the virtual cameras' centers to extract some kind of information, e.g. transformation.

FIG. 6A shows the virtual black cylinder (standing) 500B with the equally distributed blue lines 505B (parallel to the height borders 501 of the cylinder, vertically) in such a way, that the left virtual camera 11 is in the center of the cylinder. The dotted line 504L reflects the FOV of the left camera 11 on the display.

The FOV as seen by the left camera 11 is shown as the rectangle on display 21 delimited by lines 514L wherein some of the parallel line grid of lines 505B are on the display 21 lines 515B which are no longer parallel lines to their neighbors but distorted. The display shows the line undistorted, only when viewed through the lens the lines become distorted.

FIG. 6B shows the virtual black cylinder (standing) 500B with the equally distributed blue lines 505B (parallel to the height borders 501 of the cylinder, vertically) in such a way, that the right virtual camera 12 is in the center of the cylinder. The dotted line 504R reflects the FOV of the right camera 12 on the display.

The FOV as seen by the right camera 12 is shown as a rectangle on display 22 delimited by lines 514R wherein some of the parallel line grid of lines 505 are on the display 22 lines 515B which are no longer parallel lines to their neighbors but distorted. The display shows the line undistorted, only when viewed through the lens the lines become distorted.

The next step is placing the virtual black cylinder (lying) 500B' with the equally distributed lines 505B (parallel to the height of the cylinder, horizontally in such a way that the center of the virtual cameras 11, 12 is in the center of the cylinder 505B'.

The two cameras 11 and 12 each capture its image shown on the two displays 21, 22 which is shown within the borders of FOV 514. The lying initially parallel lines 505B' are now distorted displayed blue lines 515B' for the lying cylinder. Since the cameras 11 and 12 are on the same height, the same image can be shown to both cameras and they can be captured simultaneously without repositioning the target or the cameras.

The (virtual object) target lines 505B and 505B' for the calibration corresponds to the lines 515B and 515B' on the display. The content of the two displays 21 and 22 of the HMD 20, which show the virtual targets, are captured with the two cameras 21 and 22. The representations show a clear indication of distortion by distorted lines 515B and 515B'. The lines 515B and 515B' of the captured images are detected and their angles 545 and 545', respectively, are calculated with the intrinsic calibration of the cameras. The angles 545, 545' are an indication of distortion in both orthogonal directions and can be used to calibrate the two displays 21 and 22 and the two lenses 23 and 24, i.e. back-calculate the necessary distortion to be applied to the virtual image to obtain a distortion free image on the displays 21 and 22 when viewed through the lenses 23 and 24 from the DEP. FIG. 6A to 6C are related to a black cylinder with blue lines, i.e. to a specific color. The above mentioned steps of taking pictures of a virtual target can be executed for the virtual target being a black cylinder with green lines as well as a black cylinder with red lines for a calibration for each of these three channels. It is noted that the centerlines 503 and 503' have a white color to determine the middle position. The angles 545, 545' shown in FIG. 6B is similarly applicable for FIG. 6A.

The virtual cameras 11V and 12V are per definition on the center axis of the cylinder portion creating the virtual image which is then transformed as a real image for the left and right display, respectively, which are not cylindrical. The middle line is created in the middle of the image for each display and camera separately. The real cameras 11 and 12 are both shown in FIGS. 6A and 6B, although the arrow from one of the cameras to the distorted image below indicates that it is the captured image of the left display for the left camera and the captured image of the right display for the right camera in FIGS. 6A and 6B, respectively which are relevant for FIG. 6A and FIG. 6B, so the virtual IPD is not equal to zero, since the cylinders of the virtual target images created on the basis of a left and right virtual camera on the respective center axis are differing as do the real images on the left and right displays. FIG. 6A is only for left camera, FIG. 6B only for right camera.

The cylinder target is actually the same virtual object for all steps. It is only moved to the right (FIG. 6A to FIG. 6B), and rotated 90 degrees for FIG. 6C. The mentioning of "vertical" and "horizontal" lines is only for clarification. The lines on the cylinder target can also be described as being "parallel to the axis". Then the words "horizontal" and "vertical" are just clarifying what a standing or lying cylinder is.

Figures 7A, 7B, 7C:
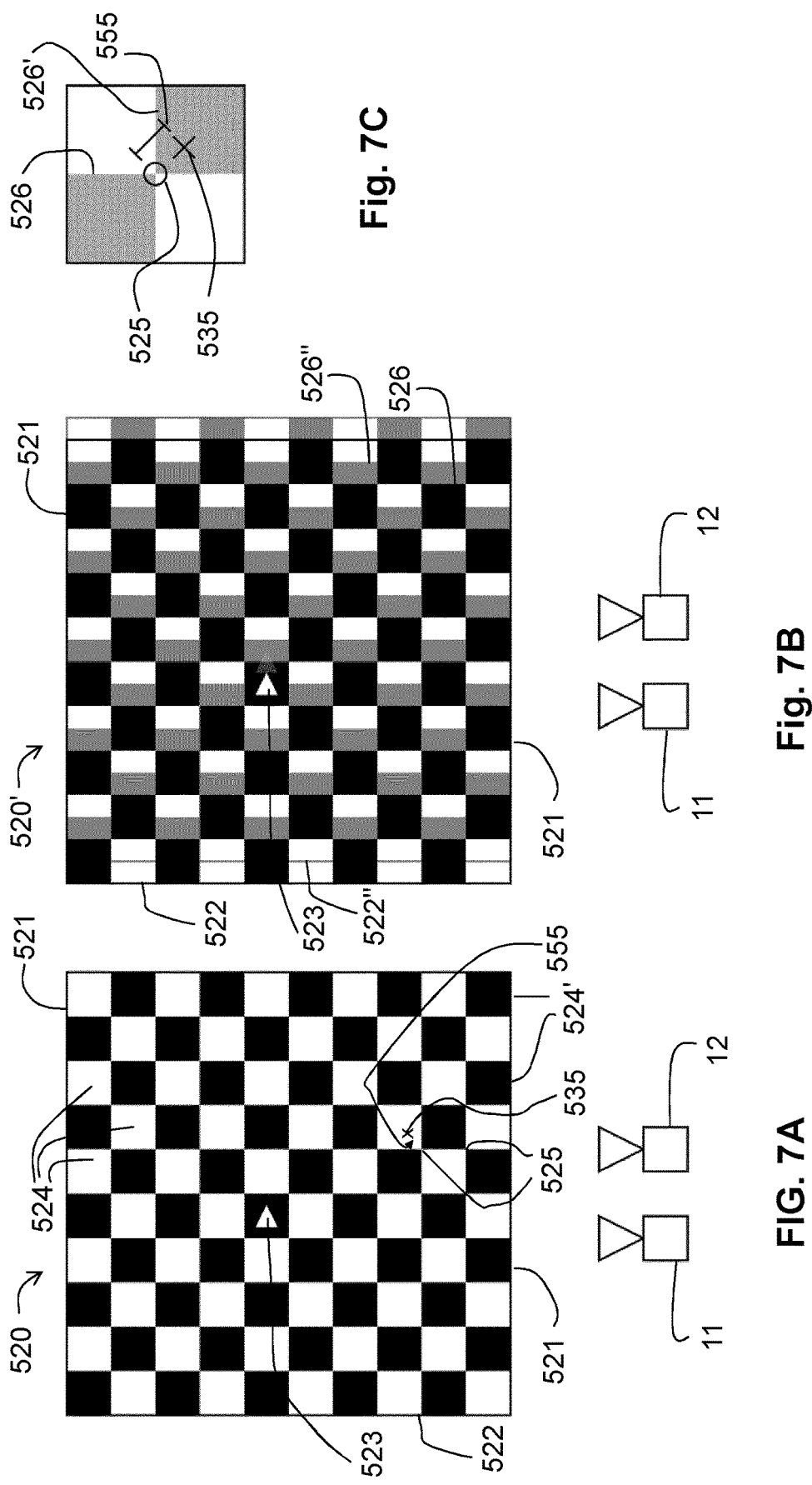
FIG. 7A shows a schematical diagram of a virtual target for one color channel in one validation step.
FIG. 7B shows a schematical diagram of a variant of a virtual target for one color channel in one validation step.
FIG. 7C shows a schematical diagram of the distortion effect for the target according to FIG. 7A.

FIG. 7A shows a schematical diagram of a virtual target for one color channel in one validation step; FIG. 7B shows a schematical diagram of a variant of a virtual target for one color channel in one validation step and FIG. 7C shows a schematical diagram of the distortion effect for the target according to FIG. 7A.

FIG. 7A shows a different target 520 being a surface with checkerboard pattern. The checkerboard pattern has black squares 524' and color squares 524. All color squares are for one target pattern 520 blue, for a different one green and finally for a third one red. Here, as can be seen in FIG. 7C, the non-distorted corner, i.e. the corner 525 as seen in a virtual target and therefore similar to e.g. blue line 505B, is shifted within the display to displayed corner 535 which is detected instead of the lines, e.g. displayed blue line 515B. It is clear that here, in the application case of the blue color, the blue lines 505B (standing cylinder) and 505B' (lying cylinder) are shown at the same time wherein these blue lines are represented by the border edges 526 and 526'. It is noted that the FOV 504L, 504R and 504 of the cameras are not shown in FIG. 7A and FIG. 7B. In both cases the border is not visible in the HMD, because the entire FOV needs to be filled with the calibration/validation pattern. The center-lines 503 and 503' of FIG. 6A to 6C are replaced here by a token 523, e.g. a white triangle in one center-near square.

The difference between the corner 525 and the displayed corner 535 is a shift 555 which is equivalent to a superposition of two angles 545 and 545' which can form the same basis for the calculation of the distortion effect for the specific color at that specific point of the FOV.

The advantage of this embodiment of a target is inter alia that the target does not have to be moved or rotated, so the steps of moving the cylinder target and providing a lying cylinder target is no longer necessary. The condition is to place the checkerboard pattern 520 so that the center of the checkerboard pattern 520 is in front of the center of the two virtual cameras 11 and 12 and the checkerboard pattern 520 fills the entire image area, i.e. FOV, of the two virtual cameras 21 and 22. In other words, the displayed lines 515B and 515B' can be replaced by the plurality of coordinates of corners 535. The detected corner points must be assigned to the different color channels for the calculation of the chromatic aberration, i.e. the checkboard pattern has to be evaluated for each of the color channels for the calculation of the chromatic aberration.

In other words, determining the shift for the plurality of predetermined points of the virtual object is related to determining the shift between the center line 503 and any one of the parallel lines 505B (which is represented as determining between the straight line 503 in the middle of FIG. 6A or 6B and the distorted lines 515B or the straight line 503' in the middle of FIG. 6C and the distorted lines 515B') or e.g. the shift between a reference point 525 and the shifted corner point 535. Determining the shift for the plurality of predetermined points of the virtual object is to be understood as determining the shift for the plurality of predetermined points of the virtual object vis-à-vis an (un-distorted) image center identifying element. This shift is evaluated for each display-camera pair, i.e. left side and right side.

FIG. 7B shows a schematical diagram of a variant of a virtual target for one color channel in one calibration step. The checkerboard pattern 520' is recorded at several positions, here established for the height edges 526 and 526'', to increase the measurement density. The displacement of the pattern 520' corresponds to a fraction (e.g. ½) of the side length of the color squares as can be seen by the side edge 522 for the first measurement and 522'' for a second measurement. The same procedure can be applied for a shift in the vertical direction, i.e. in the direction of the upper and lower edges 521 (not shown in the drawings).

The black and color areas do not necessarily have to be squares. They can be rectangles with different side length, which has an effect on the resolution (larger side length=>smaller resolution) which can be enhanced by the above mentioned partial shifting.

Figure 8:
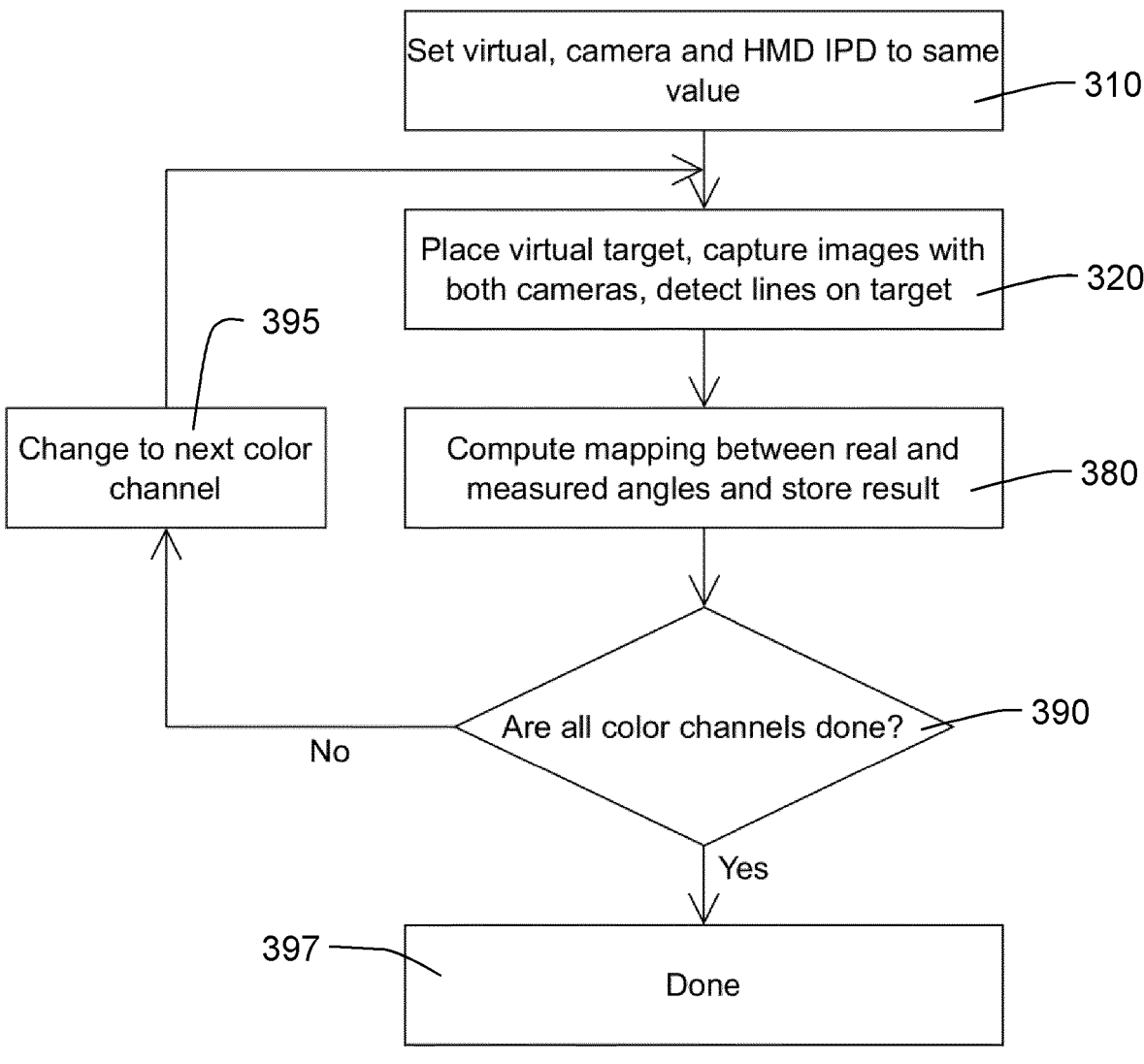
FIG. 8 shows a flow chart of the distortion determining sub method within the calibration and/or validation method executed by the calibration and validation device providing the distortion mapping in all color channels.

FIG. 8 shows a flow chart of the distortion determining sub method within the calibration and/or validation method executed by the calibration and validation device providing the distortion mapping in all color channels. The calibration method executed by the control unit 100 within the calibration device has a first step, within which the virtual IPD 130V (simulation) and IPD 130 of the cameras 11, 12 are set to a value within the HMD limit. It is known from measurements that usually the IPD for humans are between about 50 millimeters and just below 80 millimeters. Most HMDs 20 to be validated will have HMD limits within this interval. Initially in the set parameter step 310, the HMD IPD is adjusted to this value. In the placement step 320 a virtual target object 505B and subsequently 505B' or according to the simultaneous approach 525 (for the colour blue) in the simulation is at least provided and the image is shown on HMD 20 displays. This step 320 also comprises the sub step of capturing images from the two displays with the two cameras, the transfer of the images 505B and 505B' or 525, via the communication 102 to the control unit 100, detecting the target object, respectively 515B, 535 etc., in each image as taken by the cameras 11 and 12. The present invention then has a computing and mapping step 380 and determines the distortion for the respective color lines 515B and 515B' or 535, reflecting the stereoscopic approach of the two images. The computed mapping is stored in a database 105. Then a decision step 390 follows with the software switching step 395 to next specific color for repeating steps 320 and 380 for any color of the color space, usually three colors, here the RBG colors. If the computing of the distortion for all colors is terminated the calibration steps end with a closing step 397.

Figure 9:
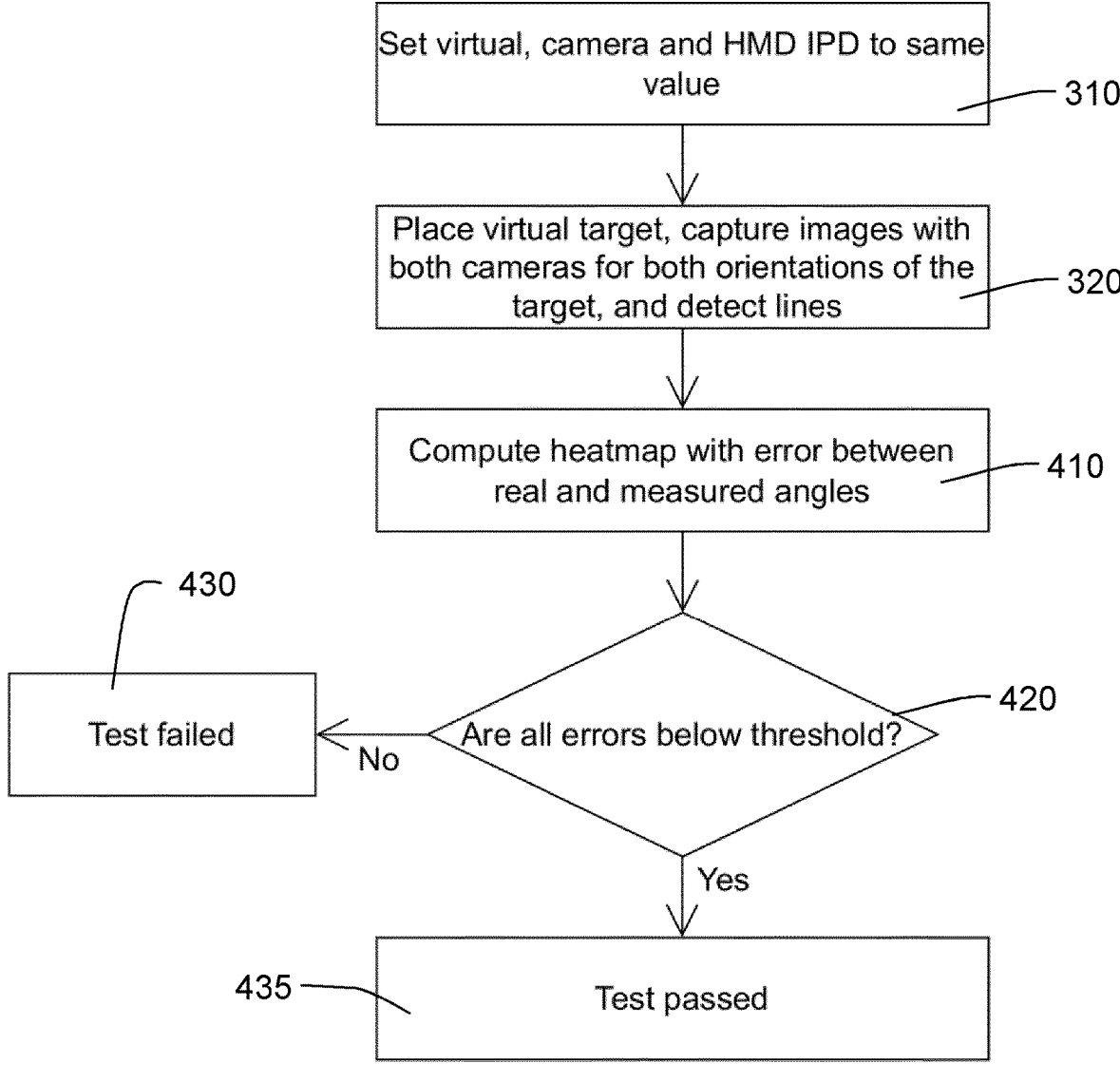
FIG. 9 shows a flow chart of the geometry validation sub method based on the established mapping.
Figure 10:
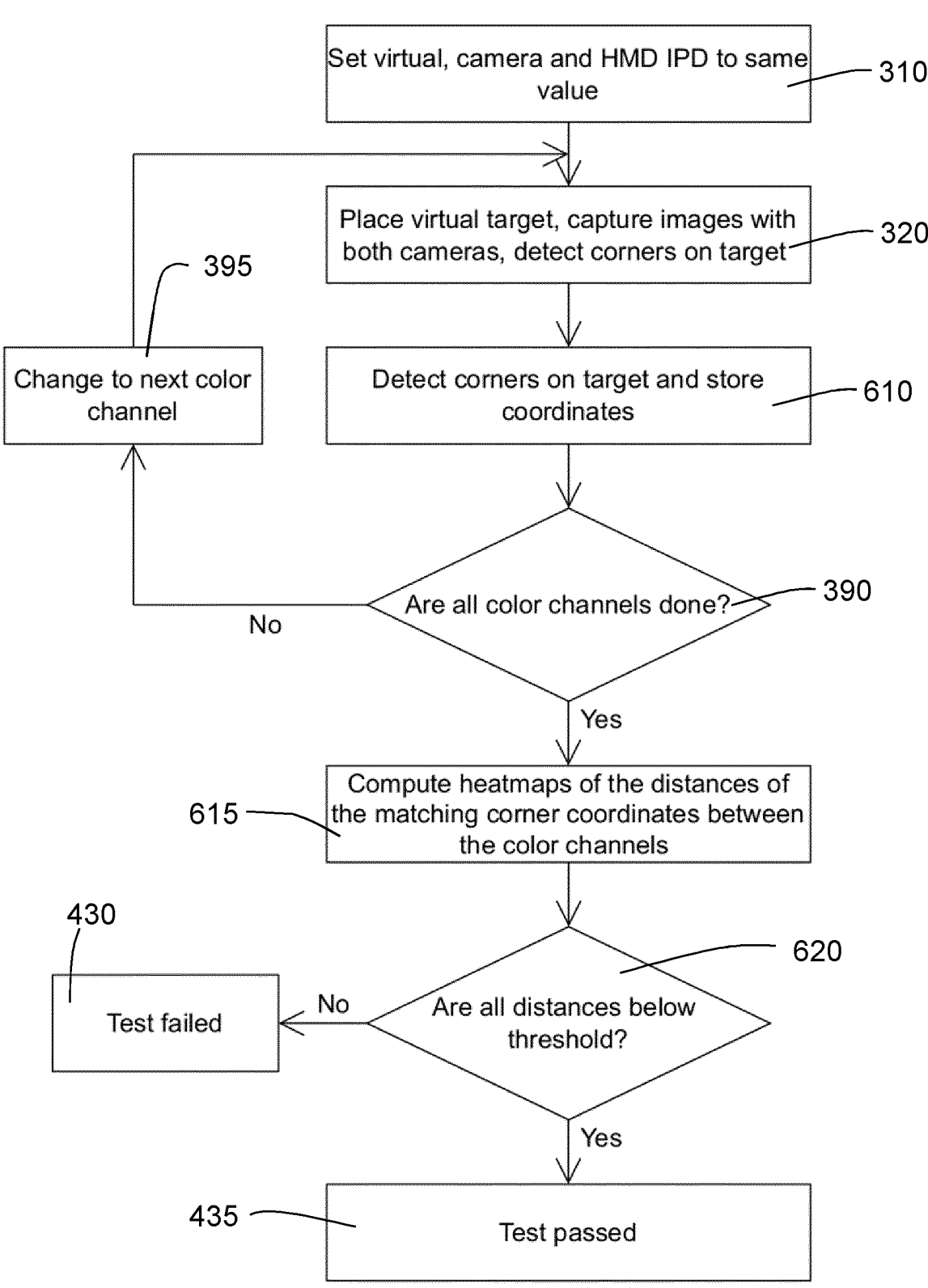
FIG. 10 shows a flow chart of the chromatic aberration sub method based on the established mapping.

The distortion as measured for each color is determined in the VR simulation and compared to the intended display of parallel lines in all colors data point. This provides—in a step not shown in FIG. 8—a re-distortion matrix to be applied to any image to be displayed to correct the distortion for any color. The following sub methods as shown in FIGS. 9 and 10 start on the assumption that the distortion has been corrected as explained above or that the HMD intended to be validated with the method according to the following paragraphs does not show any distortion or any existing distortion is precorrected. The validation steps can be thought of as a test if the calibration was successful.

FIG. 9 shows a flow chart of the geometry validation sub method based on the established mapping. Initially in the set parameter step 310, the virtual, camera and HMD IPD are adjusted to the same value. In the placement step 320 a virtual target object 505B and subsequently 505B' or according to the simultaneous approach 525 in the simulation is at least provided and the image is shown on HMD 20 display. This step 320 also comprises the sub step of capturing images from the two displays with the two cameras, the transfer of the images 505B and 505B' or 525, via the communication 102 to the control unit 100, detecting the target object, respectively 515B, 535 etc., in each image as taken by the camera 11 and 12. The difference between the step 320 of FIG. 9 and the step 320 of FIG. 8 is the fact, that the virtual target of FIG. 9 is corrected for the distortion effect, if the goal is to evaluate the fitness of the calibration. Although the letter "B" indicates a color channel, the lines of the virtual target are white and the centerline 503 is in a specific color and especially green to distinguish it from the other lines.

Providing the plurality of predetermined points 505B, 505B', 525 in the predetermined number of color channels and determining said shift 555 for each color channel comprises a sequential display of the predetermined points in each of the predetermined colors with a clear identifiable center identifying element and the determination of the respective shift in each color channel.

Chromatic aberration occurs when a lens focuses different wavelengths (colours) at different points. Therefore, chromatic aberration can be measured by detecting a point or line drawn in a first colour (e.g. red) being displayed on a display and captured through the to-be-evaluated lens and then doing the same for the same target but using a different second colour (e.g. blue). These two (sets of) positions are then used to determine the shift between two of the colour channels". For further clarification it is noted that if the distorting lenses were to be removed, an "ideal" colour blind observer would not be able to notice the switching of the target's colour (except if he notices a difference in luminance). With the lenses he would notice the target "moving" due to different distortions for different colours.

The shift between two of the color channels is the difference between identically positioned lines or points of the different one-color-images on the displays for these two colors. In other words and referring to FIG. 7C, the shift 555 from the un-shifted point 525 to shifted point 535 may be different for two different colors, e.g. greater for the red point compared to the shift for the blue point. The shift 555 has the same reference sign in the specification for each color channel and the shift as such, since there is only FIG. 7C relating to one color.

But it is clear that the value as such is or can be different for different colors. The shift can be defined by the number of shifted pixels as the geometric distance. Then the distortion of the predetermined points within the FOV of the real left and right cameras is calculated for creating a chromatic aberration heatmap for these two chosen colors for the HMD. The validation of the chromatic aberration validation is given or denied based on the chromatic aberration validation, if a predetermined number of points of the predetermined heatmap is inside or outside a predetermined heatmap threshold of the HMD. Such a threshold value can be a pixel distance value.

In another approach the shift is expressed in an angle of distortion 545 or 545' as shown in FIGS. 6B and 6C.

FIG. 7C illustrates both kinds of shifts, geometric and chromatic, as they are very similar. In case the geometry (geometric shift) is evaluated, the "true" corner's 525 location (where it should be without distortion) is computed and the observed corner's 535 location is detected in the image of the real camera. These two locations define the shift 555. In case of measuring the chromatic aberration, the corner 525 corresponds to the detected location of the corner in a first colour and the shifted corner 535 the detected location of the corner in a second colour. By definition it is not possible to measure the chromatic aberration of a single colour.

The detection of the lines as represented on the display allows in the heatmap computing step 410 to compute a heatmap comprising the difference between the real and the measured angles of the lines and/or shifting 555 of the points. This heatmap is evaluated based on predetermined maximum deviation values, which can comprise different maximum deviation values for different portions and areas of the FOV and/or sums of deviations for different areas. The results are checked in the error checking step 420 and the method ends on a test failed result 430 or the test passed result 435.

FIG. 10 shows a flow chart of the chromatic aberration sub method based on the established mapping, if the goal is to evaluate the mapping. Initially in the set parameter step 310, the virtual, camera and HMD IPD are adjusted to the same value. In the placement step 320 a virtual target object is provided and the image is shown on HMD 20 display. The target has a plurality of corners, e.g. can be a closed area surface constructed from a polygonal chain. This step 320 also comprises the sub step of capturing images from the two displays with the two cameras, the transfer of the images via the communication 102 to the control unit 100, detecting the target object, respectively the illustration of corners 526' etc., in each image as taken by the cameras 11 and 12. The difference between the step 320 of FIG. 10 and the step 320 of FIG. 8 is the fact, that the virtual target of FIG. 10 is corrected for the distortion effect. Not necessarily, a "perfect" HMD could be evaluated as well. Based on this result one can decide whether a calibration is needed or not. When the calibration is applied, the validation steps can be thought of as a test if the calibration was successful.

The corners of one or more test objects are detected and stored in a corner detection and storage step 610. This detection of the corners are performed for all colors of the color space through passing a decision step 390 followed by the software switching step 395 to next specific color for repeating steps 320 and 610 for any color of the color space, usually three colors, here the RBG colors. If the computing of the distortion for all colors is terminated a heatmap generating step 615 is provided to calculate the distances between the matching corner coordinates between the color channels.

In the color aberration step, the signals between two colors are compared, especially heatmap for Blue to Green and for Green to Red, since the greater errors will be visible between Green to Blue and towards Red on both edges of the color spectrum. Thus, based on two of the three line distortion information, the blue-line distortion, the green-line distortion and the red-line distortion, wherein the differences between these are calculated 615 and compared 620 to a predetermined threshold of distortion and validating the HMD, if the values are inside predetermined boundaries. If all values are inside the predetermined thresholds, the test step 435 is passed, else the test step is failed 430.

Figure 11:
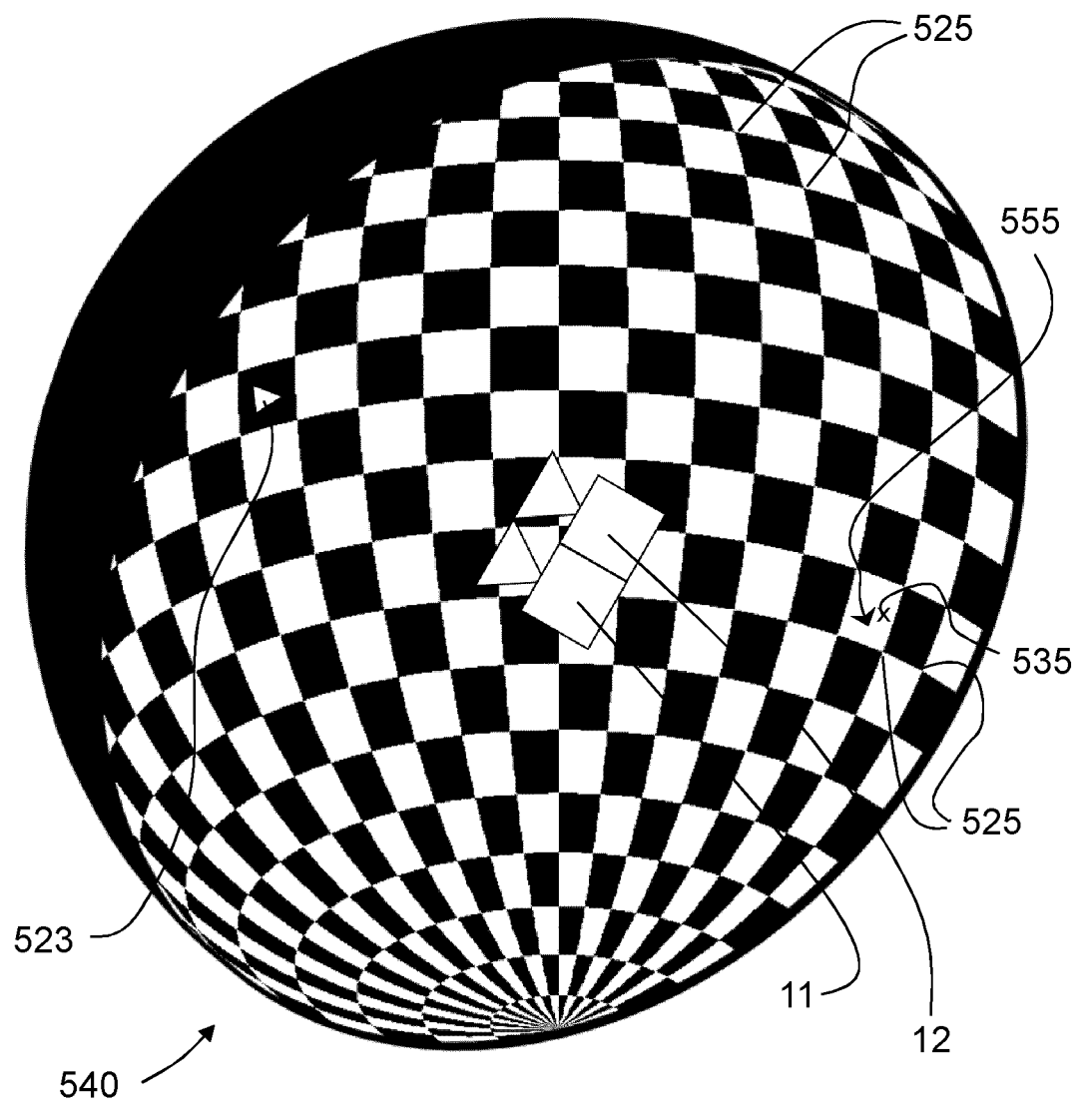
FIG. 11 shows a schematical diagram of a variant of a virtual target for one color channel in one validation step.

FIG. 11 shows a schematical diagram of a variant of a virtual target for one color channel in one validation step. Here, a variant of a virtual target for one color channel is suggested with a projected spherically shaped surface 540. The cameras 11 and 12 are looking on the projected sphere, wherein the FOV of the cameras is centered around the middle token 523. This projection has different color areas with four corners 525 which are changing as being more distant to the centered middle token 523. The distortion leads to a similar effect of representation of a point 525 shifted to a displayed point 535 with a shift 555 from the original point.

| LIST OF REFERENCE SIGNS | |
| --- | --- |
| 10 | measurement device |
| 10V | virtual camera rig |
| 10' | downward and IPD shifted measurement device |
| 10" | backwards shifted measurement device |
| 11 | left camera |
| 11' | shifted left camera |
| 11V | virtual left camera |
| 12 | right camera |
| 12' | shifted right camera |
| 12V | virtual right camera |
| 20 | HMD |
| 21 | left eye display |
| 22 | right eye display |
| 23 | left side optics |
| 24 | right side optics |
| 25 | fixation element |
| 100 | control unit |
| 101 | communication line HMD |
| 102 | communication line measurement device |
| 105 | database |
| 110 | eye socket position |
| 110' | shifted eye socket position |
| 111 | relief movement |
| 120 | height position of cameras |
| 120' | shifted height position of cameras |
| 121 | vertical / height movement |
| 130 | camera IPD |
| 130V | virtual IPD |
| 130' | camera IPD |
| 131 | camera IPD movement |
| 131V | virtual camera IPD movement |
| 140 | target distance |
| 150 | virtual target |
| 230 | HMD IPD |
| 231 | HMD IPD movement |
| 310 | set parameter step |
| 320 | target placement step |
| 380 | computing step |
| 390 | colour checking step |
| 395 | colour changing step |
| 397 | closing step |
| 410 | heatmap computing step |
| 420 | error checking step |
| 430 | failed test result |
| 435 | passed test result |
| 500B, 500G, 500R | standing virtual black cylinder with blue, green and red lines, respectively |
| 500B' | lying virtual black cylinder with blue lines |
| 501 | height border of the cylinder |
| 502 | side border of the cylinder |
| 503 | centerline |

-continued

| LIST OF REFERENCE SIGNS | |
| --- | --- |
| 503' | centerline |
| 504 | FOV of either camera (cylinder lying) |
| 504L | FOV of left camera |
| 504R | FOV of right camera |
| 505B | blue line (standing cylinder) |
| 505B' | blue line (lying cylinder) |
| 505G | green line |
| 505R | red line |
| 514 | display borders of FOV (lying cylinder) |
| 514L | display borders of FOV for left camera |
| 515B | displayed blue lines (standing cylinder) |
| 515B' | displayed blue lines (lying cylinder) |
| 520 | checkerboard target pattern (any one color) |
| 520' | checkerboard target pattern for displacement |
| 521 | upper / lower edge |
| 522 | side edge |
| 522" | displaced side edge |
| 523 | token |
| 524 | color quadrilaterals / squares |
| 524' | black quadrilaterals / squares |
| 525 | corner |
| 526 | border edge (line) |
| 526' | border edge (line) |
| 526" | displaced border edge (line) |
| 535 | displayed corner |
| 545 | angle |
| 555 | shift |
| 540 | curved target pattern (any one color) |
| 610 | detection and storage step |
| 615 | heatmap generating step |

The invention claimed is:

1. A system for chromatic aberration and geometry calibration and validation of virtual reality head mounted displays (VR HMDs) comprising:

a left eye display and a right eye display, a measurement device configured in a way that an HMD to be calibrated or validated is attachable to it in a way as such an HMD would be removably attached to the head of a user;

wherein the measurement device comprises:

a left and a right camera, wherein each camera is intrinsically and extrinsically calibrated, and a control unit connected to the two cameras as well as configured to deliver control signals to the HMD when removably attached to the measurement device and when a camera inter pupillary distance (IPD) is manually or automatically adjusted to a prechosen HMD IPD, wherein the control unit is configured to execute steps comprising:

a.) setting a virtual IPD equal to the value of camera IPD, b.) creating a virtual target object for the displays, the virtual target object having an image center identifying element and a plurality of predetermined points within a field of view (FOV) of the cameras, c.) calculating and transmitting images of said virtual target object to the displays of the HMD, d.) taking the images of the displays through the HMD lenses with the cameras, e.) detecting the virtual object and the image center identifying element within the images, f.) determining a shift, for each camera, for the plurality of predetermined points of the virtual object in relation to the image center identifying element, wherein the control unit is further configured for g.) determining said shift for each color channel of a plurality of color channels, and using the shift between one of the color channels and another for calculating a distortion of the predetermined points within the FOV of the cameras, creating a chromatic aberration heatmap for the HMD based on the shift between the two colors, and determining the chromatic aberration validation or denying the chromatic aberration validation, if a predetermined number of points of the predetermined heatmap is inside or outside a predetermined heatmap threshold of the HMD, respectively; and h.) determining said shift for the plurality of predetermined points colored black on a white background, or for the plurality of predetermined points colored white on a black background, using the shift for creating a geometry heatmap for the HMD, and determining the geometry validation or denying the geometry validation, if a predetermined number of points of the geometry heatmap is inside or outside a predetermined heatmap threshold of the HMD, respectively, wherein the virtual target object a black cylinder portion with vertical lines in a color or white to be taken separately by each camera with the image center identifying element being a centrally arranged line for each camera and the virtual camera being arranged on the center axis of the cylinder portion, or a black cylinder portion with horizontal lines in a color or white to be taken separately by each camera with the image center identifying element being a centrally arranged line for each camera and the virtual camera being arranged on the center axis of the cylinder portion.

2. The system according to claim 1, wherein the shift of the virtual target object is expressed as a plurality of angle values between a distorted line on the virtual target object in relation to the image center identifying element.

3. A system for chromatic aberration and geometry calibration and validation of virtual reality head mounted displays (VR HMDs) comprising:

a left eye display and a right eye display, a measurement device configured in a way that an HMD to be calibrated or validated is attachable to it in a way as such an HMD would be removably attached to the head of a user;

wherein the measurement device comprises:

a left and a right camera, wherein each camera is intrinsically and extrinsically calibrated, and a control unit connected to the two cameras as well as configured to deliver control signals to the HMD when removably attached to the measurement device and when a camera inter pupillary distance (IPD) is manually or automatically adjusted to a prechosen HMD IPD, wherein the control unit is configured to execute steps comprising:

a.) setting a virtual IPD equal to the value of camera IPD, b.) creating a virtual target object for the displays, the virtual target object having an image center identifying element and a plurality of predetermined points within a field of view (FOV) of the cameras, c.) calculating and transmitting images of said virtual target object to the displays of the HMD, d.) taking the images of the displays through the HMD lenses with the cameras, e.) detecting the virtual object and the image center identifying element within the images, f.) determining a shift, for each camera, for the plurality of predetermined points of the virtual object in relation to the image center identifying element, wherein the control unit is further configured for g.) determining said shift for each color channel of a plurality of color channels, and using the shift between one of the color channels and another for calculating a distortion of the predetermined points within the FOV of the cameras, creating a chromatic aberration heatmap for the HMD based on the shift between the two colors, and determining the chromatic aberration validation or denying the chromatic aberration validation, if a predetermined number of points of the predetermined heatmap is inside or outside a predetermined heatmap threshold of the HMD, respectively; and h.) determining said shift for the plurality of predetermined points colored black on a white background, or for the plurality of predetermined points colored white on a black background, using the shift for creating a geometry heatmap for the HMD, and determining the geometry validation or denying the geometry validation, if a predetermined number of points of the geometry heatmap is inside or outside a predetermined heatmap threshold of the HMD, respectively, wherein the virtual target object comprises a checkerboard target pattern or curved target pattern with a grid of quadrilaterals in a color to be taken separately by each camera with the image center identifying element being a centrally detectable element for each camera and the virtual camera being arranged in the center of the virtual target object.

4. The system according to claim 3, wherein the shift of the virtual target object comprises a plurality of shifts between a corner of the virtual target object pattern and a displayed corner of quadrilaterals.

5. The system according to claim 3, wherein the checkerboard target pattern or curved target pattern is recorded with several positions and a displacement of a predetermined fraction of the quadrilateral side length to provide a higher resolution of the points.

6. The system according to claim 5, wherein the color channels are three color channels of an RGB color space or four color channels of a CMYK color space.

7. The system according to claim 6, wherein the color channels are two pairs of two color channels chosen in the RGB space and are red-and-green and blue-and-green.

8. The system according to claim 2, wherein the control unit is further configured for using the shift for creating a heatmap for the HMD comprising the difference between the real and the measured angles of the lines and determining the geometry validation or denying the geometry validation, if a predetermined number of points of the predetermined heatmap is inside or outside a predetermined heatmap threshold of the HMD, respectively.

9. The system according to claim 4, wherein the control unit is further configured for using the shift for creating a heatmap for the HMD comprising the shifts between the corners and displayed corners and determining the geometry validation or denying the geometry validation, if a predetermined number of points of the predetermined heatmap is inside or outside a predetermined heatmap threshold of the HMD, respectively.

* * * * *